US012433813B2

(12) United States Patent
Cole

(10) Patent No.: US 12,433,813 B2
(45) Date of Patent: Oct. 7, 2025

(54) LEG IMMOBILIZER

(71) Applicant: The United States Government as represented by the Department of Veterans Affairs, Washington, DC (US)

(72) Inventor: Debra J. Cole, Richmond, VA (US)

(73) Assignee: THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 283 days.

(21) Appl. No.: 18/076,499

(22) Filed: Dec. 7, 2022

(65) Prior Publication Data

US 2023/0329953 A1 Oct. 19, 2023

Related U.S. Application Data

(60) Provisional application No. 63/286,779, filed on Dec. 7, 2021.

(51) Int. Cl.
*A61G 13/12* (2006.01)

(52) U.S. Cl.
CPC ..... *A61G 13/1245* (2013.01); *A61G 13/1265* (2013.01); *A61G 13/1285* (2013.01); *A61G 13/129* (2013.01)

(58) Field of Classification Search
CPC ............ A61G 13/1245; A61G 13/1265; A61G 13/1285; A61G 13/129; A61G 2200/327; A61G 2210/50; A61G 13/125; A61G 7/0755; A61G 7/075; A61G 13/12; A47C 20/021; A47C 20/023; A47C 20/025; A47C 20/02; A47C 20/026; A47C 20/027; A47C 27/081; A47C 27/144; A47C 27/148; A61F 5/01; A61F 5/0193; A61F 5/0585
USPC ... 5/648, 650, 624, 632, 630, 651, 652, 513, 5/601, 621, 655.3, 600, 618; 128/845, 128/882, 892, 846; 602/24, 23, 26, 5; 606/240; D24/190, 183
See application file for complete search history.

(56) References Cited

U.S. PATENT DOCUMENTS

| | | | | |
|---|---|---|---|---|
| 3,532,336 A * | 10/1970 | Baker | A61G 7/0755 | 5/624 |
| 4,185,813 A * | 1/1980 | Spann | A61G 13/12 | 5/648 |
| 5,289,828 A * | 3/1994 | Toth | A61F 5/01 | 5/624 |
| 2008/0178390 A1* | 7/2008 | DuDonis | A47C 20/021 | 5/655.5 |

(Continued)

*Primary Examiner* — Madison Emanski
(74) *Attorney, Agent, or Firm* — Ballard Spahr LLP

(57) ABSTRACT

A leg immobilizer for securing the leg of a patient during a procedure in an elevated position, the leg including a thigh portion, a popliteal fossa portion and a knee portion. The leg immobilizer includes a padded bolster having a leg engagement channel formed in its top surface. The leg engagement channel includes a thigh engagement portion, a popliteal fossa engagement portion, a calf engagement portion, and ankle engagement portion, and two continuous leg side engagement surfaces. The two continuous leg side engagement surfaces prevent lateral movement of the leg when the leg is positioned within the leg engagement channel.

19 Claims, 11 Drawing Sheets

(56) References Cited

U.S. PATENT DOCUMENTS

| | | | | |
|---|---|---|---|---|
| 2011/0231995 | A1* | 9/2011 | Sedillo | A61B 6/0421 5/601 |
| 2016/0051431 | A1* | 2/2016 | Staats | A61G 7/072 5/636 |
| 2021/0106142 | A1* | 4/2021 | Kelly | A61F 5/34 |

* cited by examiner

LEG IMMOBILIZER

CROSS REFERENCE TO RELATED APPLICATIONS

This application is based upon and claims benefit of priority to U.S. Provisional Application No. 63/286,779, filed Dec. 7, 2021, which application is hereby incorporated by reference herein.

FIELD OF THE INVENTION

This invention relates to medical leg supporters and immobilizers used to maintain a position of a patient's leg during medical procedures such as surgery. This invention further relates generally to a leg supporter capable of maintaining a user's leg in an elevated position while maintaining user's comfort.

BACKGROUND

Many medical procedures require a patient's extremities be held in a stable position during the procedure. Often the patient's receiving these procedures are already in pain from their conditions that are being treated. Therapeutic procedures may also bring discomfort or temporary pain to the patients. If the patient reacts to this discomfort by moving out of the stable position, it may delay or otherwise side track the procedure.

In one example, during knee procedures, the lower leg of a patient must remain stable. During X-Ray Guided Joint Injections a doctor will insert needles into a patient's knee while monitoring the needle placement using the live x-ray imaging. Contrast may also be injected to insure the proper placement of the needles prior to the injection of steroids or other medication. However, during the insertion of the needles into the patient's knee the patient may react by moving their leg out of alignment for the correct insertion under x-ray. This may require repositioning the patient, extending the procedure time, possible sedation of the patient, and in some cases rescheduling of the procedure. Often continuous repositioning of the patient during the procedure is required.

Physicians and technicians have attempted to utilize pillows, folded sheets and even tape to secure the patient's leg to the table. While these have some efficacy for procedures that only required x-ray monitoring from directly above the knee, the side views are often obscured by the materials or the overlap with the patient's other leg.

It would be desirable to have a leg supporter/immobilizer that could maintain the position of a patient's leg during procedures that reduced or eliminated the need for repositioning the patient. It would also be desirable to have a leg supporter/immobilizer that positioned a patient's knee such that side x-ray views were not obscured. It would also be desirable to have such a leg supporter/immobilizer that was comfortable for the patient to reduce discomfort and provide a relaxing experience during otherwise uncomfortable procedures. It would also be desirable for such a device to be equally operable as a take home device for patients who require leg elevation for extended period of times or while sleeping.

SUMMARY

The invention concerns a leg immobilizer for securing the leg of a patient during a procedure in an elevated position.

The leg includes a thigh portion, a popliteal fossa portion and knee portion, a calf portion and an ankle portion. In an example embodiment the leg immobilizer comprises a padded bolster having a bottom surface, a front surface, a rear surface, and a top surface. A leg engagement channel is formed in the top surface. The leg engagement channel includes a thigh engagement portion, a popliteal fossa engagement portion, a calf engagement portion, an ankle engagement portion, and two continuous leg side engagement surfaces extending from the thigh engagement portion to the ankle engagement portion. The two continuous leg side engagement surfaces prevent lateral movement of the leg of the patient when positioned within the leg engagement channel.

By way of example, the popliteal fossa engagement portion has a channel depth such that the knee portion of the patient's leg extends above the top surface when the leg of the patient is positioned within the leg engagement channel. In a further example the padded bolster comprises a removable cover and a foam insert positioned within the removable cover. In an example embodiment the foam insert may comprise a lower foam portion comprising semi-rigid foam and an upper form portion comprising compressible foam. Further by way of example, the foam insert comprises a lower foam portion comprising semi-rigid foam. The lower foam portion has a bottom foam surface and an upper foam surface. A plurality of compressible foam tubes may be positioned on the upper foam surface to form the leg engagement channel.

In an example embodiment the foam insert may comprise a lower foam portion comprising semi-rigid foam. The lower foam portion has a bottom foam surface and an upper foam surface and a plurality of inflatable tubes positioned on the upper foam surface to form the leg engagement channel. The plurality of inflatable tubes have an adjustable inflation level to control a channel width of the leg engagement channel. In an example embodiment a leg immobilizer according to the invention may further comprise a rigid frame housing the foam insert. By way of example the rigid frame housing may comprise a thigh entry cutout and an ankle exit cutout.

An example leg immobilizer according to the invention may further comprise a vertical retention member. The vertical retention member prevents vertical movement of the leg of the patient when positioned within the leg engagement channel. In a further example embodiment the vertical retention member comprises a vertical retention strap. Additionally, an example leg immobilizer according to the invention may further comprise a weight element positioned in the lower foam portion.

The invention also encompasses a medical arrangement for securing the leg of a patient during treatment. The leg includes a thigh portion, a popliteal fossa and knee portion, a calf portion and an ankle portion. In an example embodiment the medical arrangement comprises a procedure table for supporting the patient in a supine position, at least one medical imaging device and a leg immobilizer comprising a padded bolster having a bottom surface, a front surface, a rear surface, and a top surface. The padded bolster comprises a removable cover and a foam insert positioned within the removable cover. A leg engagement channel is formed in the top surface. By way of example the leg engagement channel includes a thigh engagement portion, a popliteal fossa engagement portion, a calf engagement portion, an ankle engagement portion, and two continuous leg side engagement surfaces extending from the thigh engagement portion to the ankle engagement portion. The two continuous leg side engagement surfaces prevent lateral movement of the leg of the patient when positioned within the leg engagement channel.

In an example embodiment the popliteal fossa engagement portion has a channel depth such that the knee portion of the patient's leg extends above the top surface when the leg of the patient is positioned within the leg engagement channel. Further by way of example, the thigh engagement portion is angled away from the bottom surface and the popliteal fossa engagement portion and the calf engagement portion are parallel to the bottom surface. In an example embodiment the foam insert comprises a lower foam portion comprising semi-rigid foam and an upper foam portion comprising compressible foam.

In an example embodiment, the medical arrangement according to the invention may further comprise a plurality of compressible foam tubes positioned on the upper foam portion. The plurality of foam tubes and the upper foam portion form the leg engagement channel in this example. Also by way of example, the foam insert comprises a lower foam portion comprising semi-rigid foam. The lower foam portion has a bottom foam surface and an upper foam surface and a plurality of inflatable tubes positioned on the upper foam surface to form the leg engagement channel. The plurality of inflatable tubes have an adjustable inflation level top control a channel width of the leg engagement channel.

By way of example, the removable cover comprises a polyurethane material. Also by way of example, a rigid frame houses the foam insert. The rigid frame housing may comprise a thigh entry cutout and an ankle cutout. In a further example, the rigid frame housing may comprise a plurality of side knee cutouts. An example embodiment of a medical arrangement according to the invention may further comprise a vertical retention member preventing vertical movement of the leg of the patient when positioned within the leg engagement channel. The vertical retention member may comprise a vertical retention strap and a weight element positioned in the lower foam portion.

The invention may further encompass a leg immobilizer for use to elevate a leg. The leg includes a thigh portion, a popliteal fossa portion and knee portion, a calf portion and an ankle portion. In an example embodiment the leg immobilizer comprises a padded bolster having a bottom surface, a front surface, a rear surface, and a top surface. A leg engagement channel is formed in the top surface. The leg engagement channel including a thigh engagement portion, a popliteal fossa engagement portion, a calf engagement portion, an ankle engagement portion, and two continuous leg side engagement surfaces extending from the thigh engagement portion to the ankle engagement portion. The two continuous leg side engagement surfaces prevent lateral movement of the leg of the user when positioned within the leg engagement channel.

DETAILED DESCRIPTION

Figure 1:
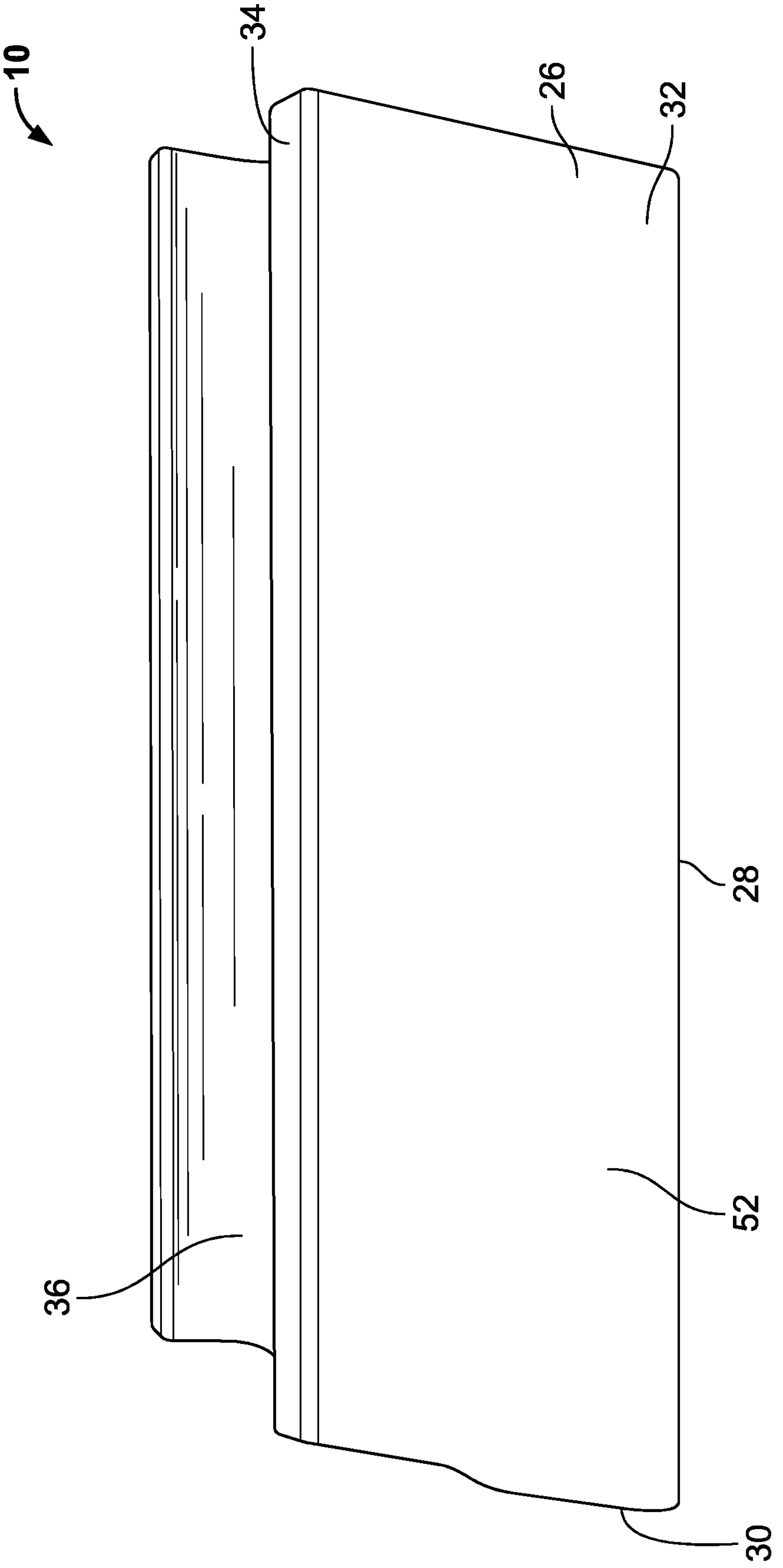
FIG. 1 shows an example embodiment of a leg immobilizer according to the invention.
Figure 2:
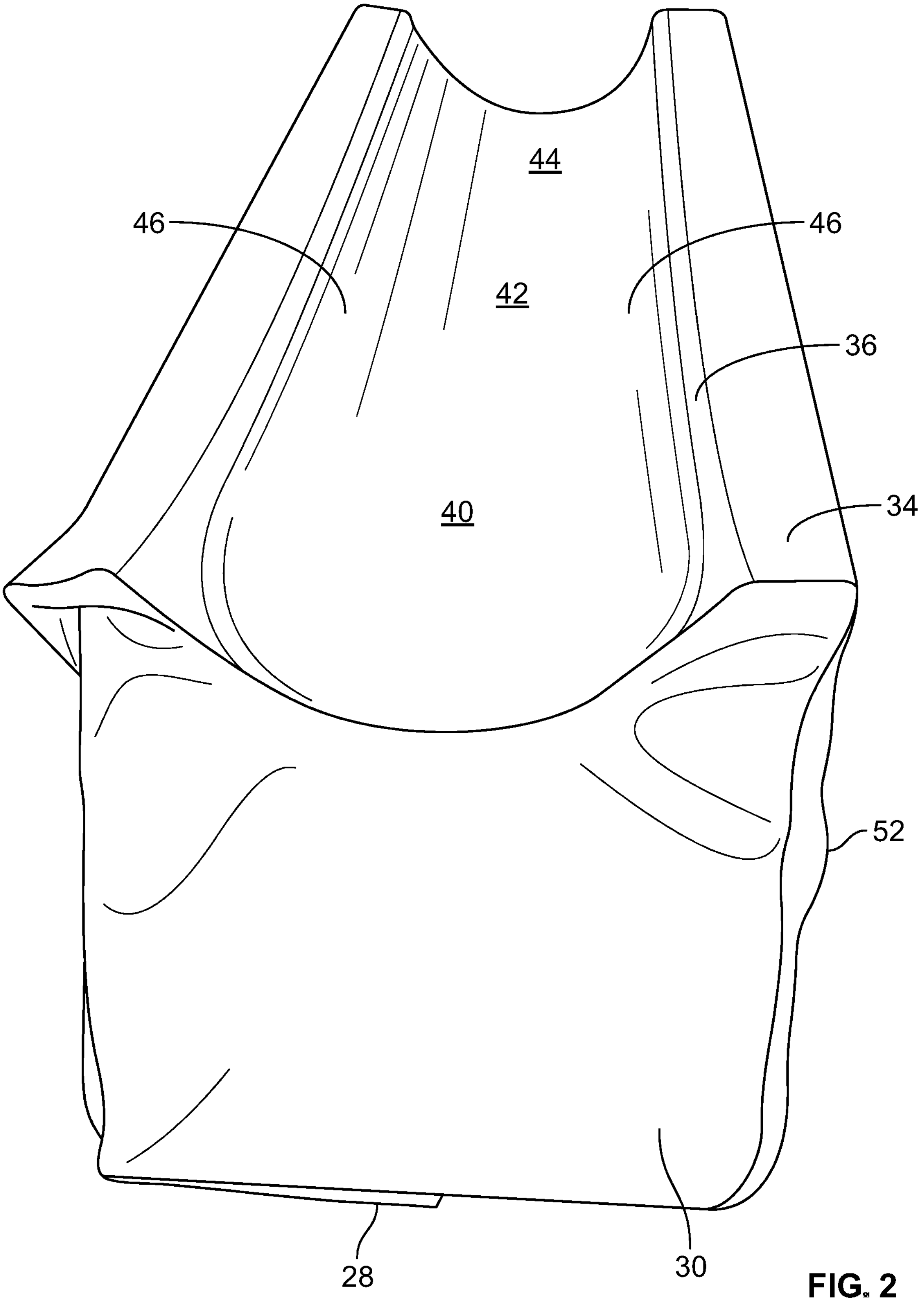
FIG. 2 is a side view of the leg immobilizer shown in FIG. 1.
Figure 3:
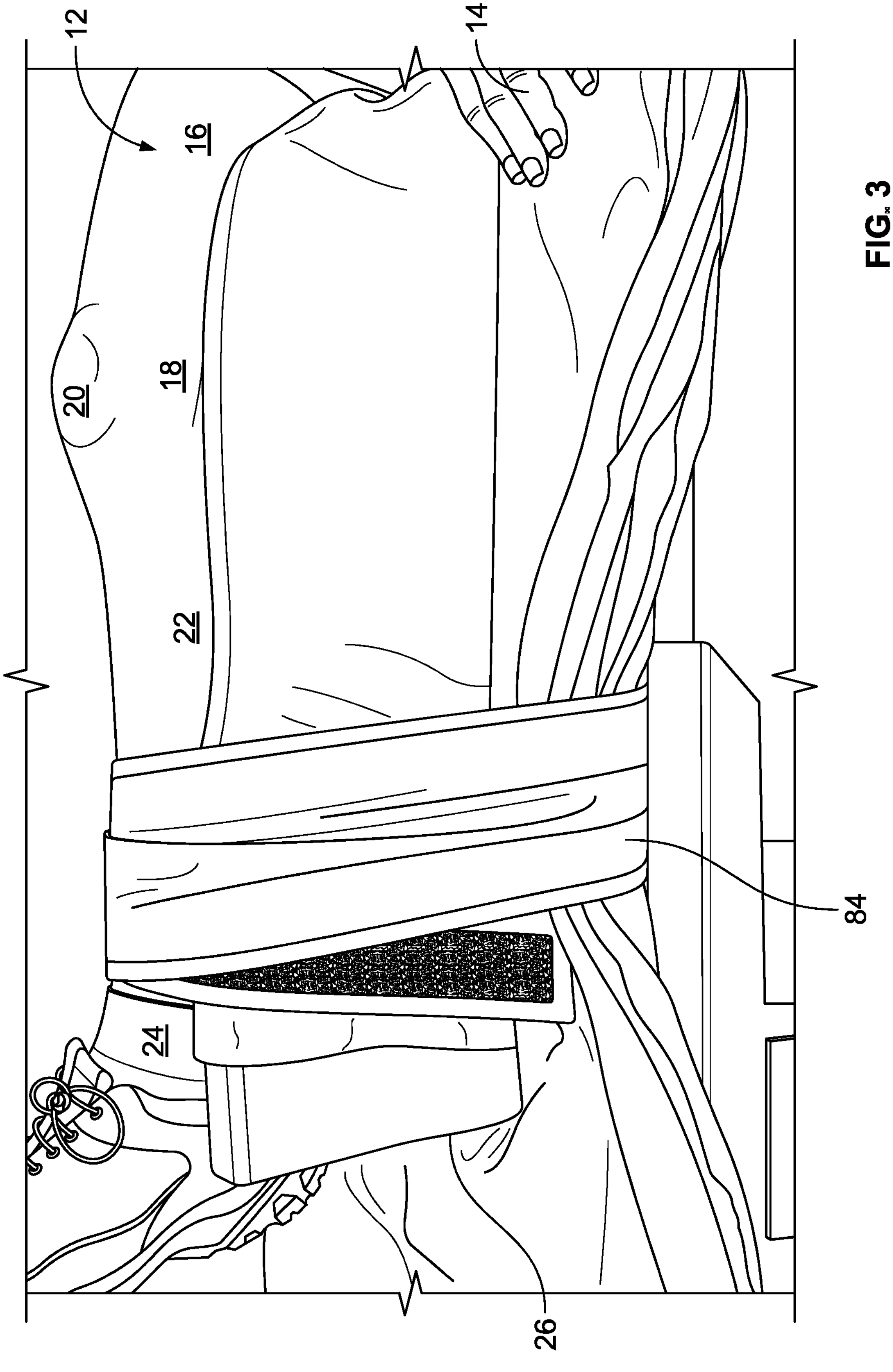
FIG. 3 illustrates the leg immobilizer shown in FIG. 1, the leg immobilizer shown with a patient's leg restrained therein.

The present disclosure can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

FIGS. 1-4 show an example of a leg immobilizer 10 according to the disclosure. The leg immobilizer 10 is designed to constrict motion of the leg 12 of a patient 14. The leg 12 is defined by a thigh portion 16, a popliteal fossa portion 18, a knee portion 20, a calf portion 22, and an ankle portion 24 (see FIG. 4). The leg immobilizer 10 comprises a padded bolster 26 having a bottom surface 28, a front surface 30, a rear surface 32, and a top surface 34. A leg engagement channel 36 is formed on the top surface 34 and includes a thigh engagement portion 38, a popliteal fossa engagement portion 40, a calf engagement portion 42, and an ankle engagement portion 44. The leg engagement channel 36 further includes two continuous leg side engagement surfaces 46 extending continuously from the front surface 30 to the rear surface 32. The two continuous leg side engagement surfaces 46 prevent lateral movement of the leg 12 of the patient 14 when the leg 12 is positioned within the leg engagement channel 36. In one example, the leg engagement channel 36 has a channel depth 48 in at least the location of the popliteal fossa engagement portion 40 such that when the knee portion 20 of the leg 12 is positioned in the leg engagement channel 36 the knee portion 20 extends above the top surface 34 of the padded bolster 26. This allows for unobstructed medical imaging to be performed on the knee portion 20 even from a side angle. In one particular example, the leg engagement channel 36 has a channel width 50 of approximately 7.5 inches and a channel depth 48 of approximately 3 inches (see FIG. 5). The dimensions described are illustrative and indicative of an average leg proportion. However, it is contemplated that the described leg immobilizer may be formed in various dimensions to accommodate different ranges or sizes of patients.

Figure 4:
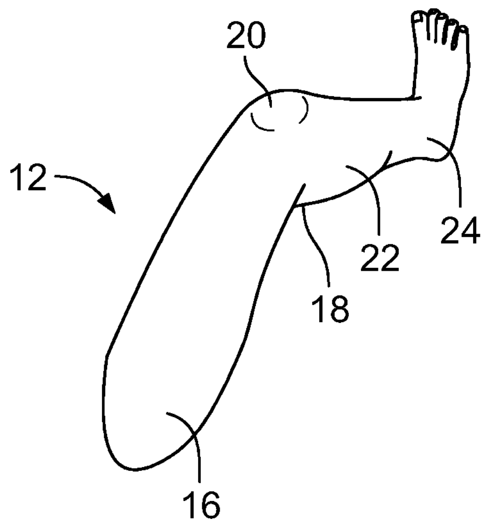
FIG. 4 shows a foam insert for use in the leg immobilizer shown in FIG. 1.
Figure 4:
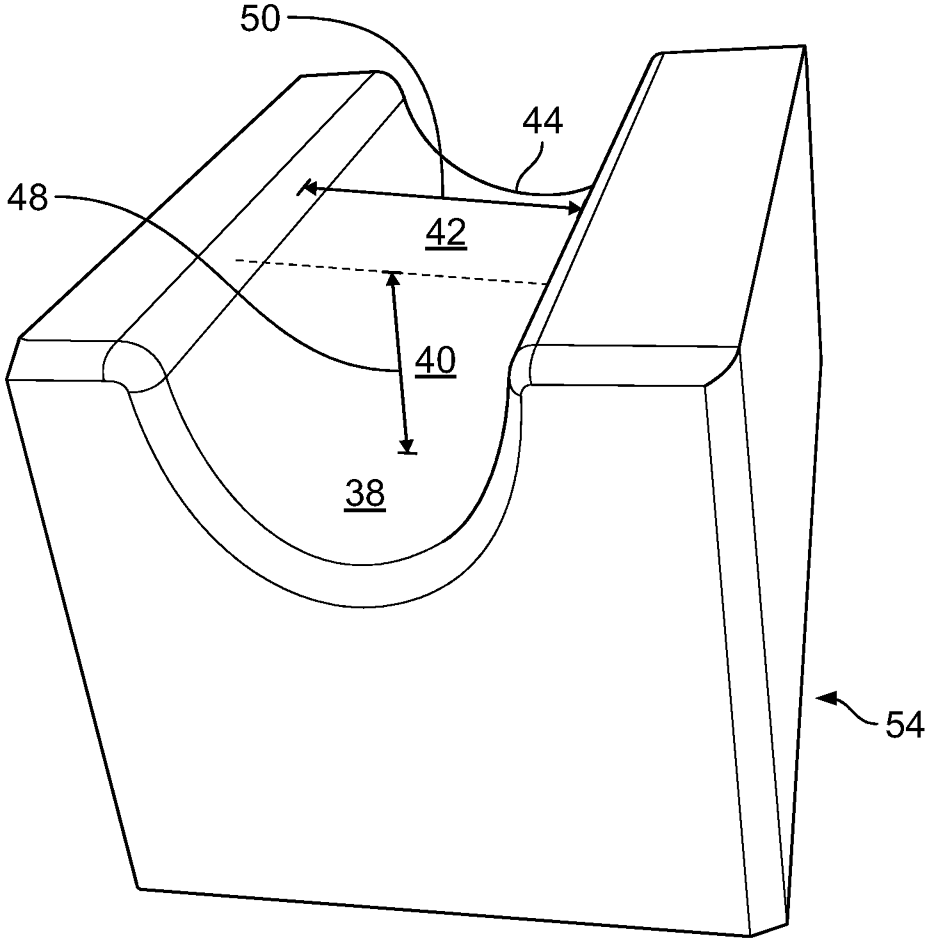
Figure 5:
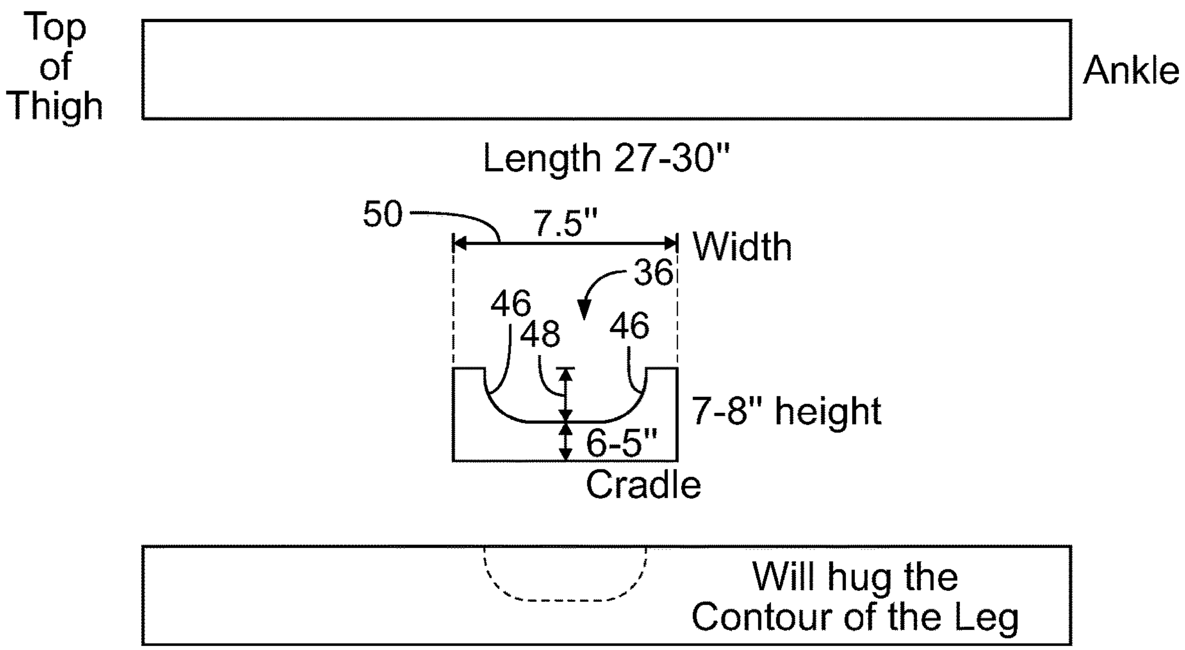
FIG. 5 is a sketch of example dimensions of the leg immobilizer shown in FIG. 1.
Figure 6:
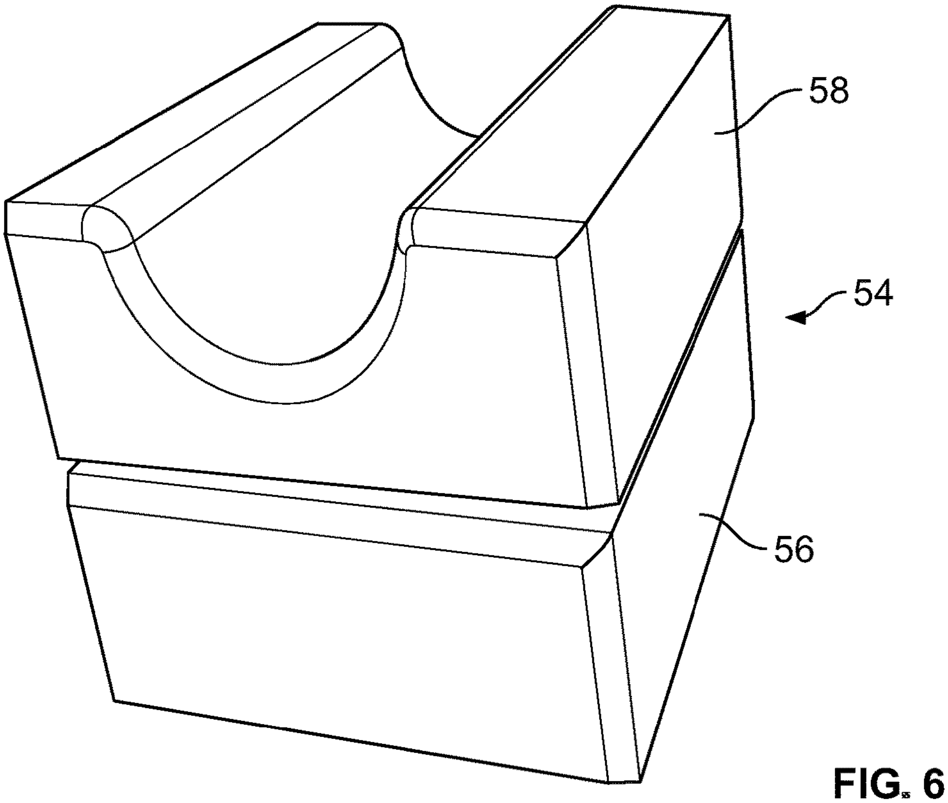
FIG. 6 is an example of a foam insert for use in the leg immobilizer shown in FIG. 1.

Although it is contemplated that the padded bolster 26 may be formed in a variety of fashions, in one example the padded bolster 26 is comprised of a removable cover 52 covering a foam insert 54 (see FIG. 4). It is contemplated that the removable cover 52 may be formed of a variety of pliable materials such as leather or polyurethane. The removable cover 52 may be made of a material that is resistant from degradation due to exposure to government standard cleaning products such as Sani-Cloth such that bactericidal, tuberculocial and virucidal products do not degrade the removable cover's 52 integrity. Industrial stitching may be employed to ensure that bodily fluids, medicines, or other treatment substances cannot penetrate the removable cover 52 during use. The removable cover 52 may be sealed around the foam insert 54 in a variety of fashions including, but not limited to, Velcro fasteners, zippers, snaps, etc. In the example shown in FIG. 4, the foam insert 54 maybe formed as a single structure of semi-compressible foam. In an alternate example, shown in FIG. 6, the foam insert 54 may be formed using a lower foam portion 56 composed of semi-rigid foam and an upper form portion 58 composed of compressible foam. This allows the patient 14 to experience comfort while their leg 12 is positioned in the leg engagement channel 36 while simultaneously having the required vertical positioning provided by the semi-rigid foam of the lower foam portion 56.

Figure 7:
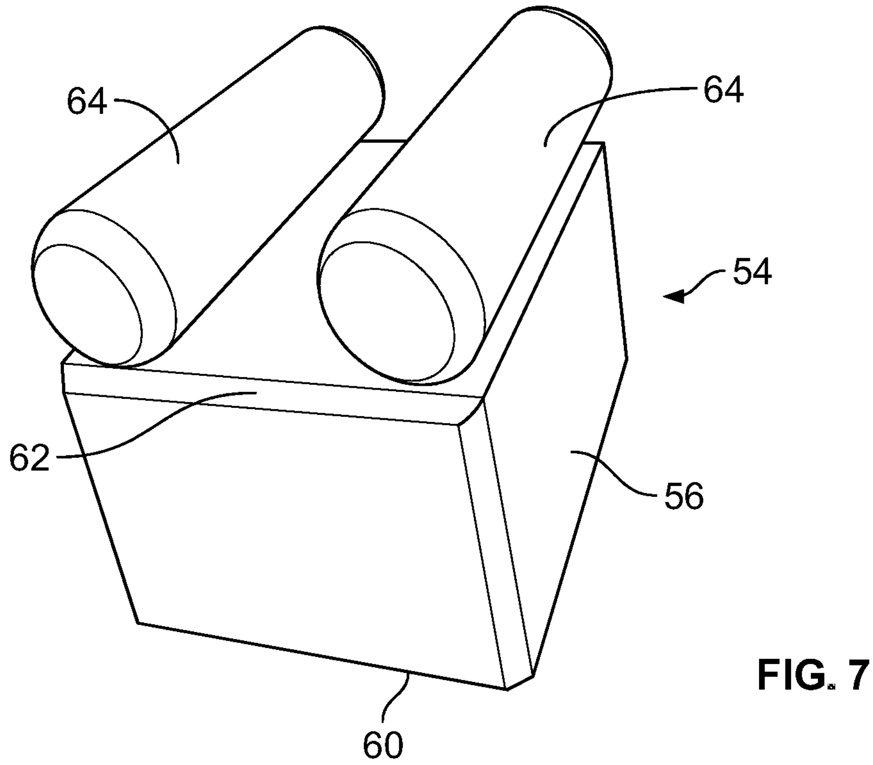
FIG. 7 is an example of a foam insert for use in the leg immobilizer shown in FIG. 1.
Figure 8:
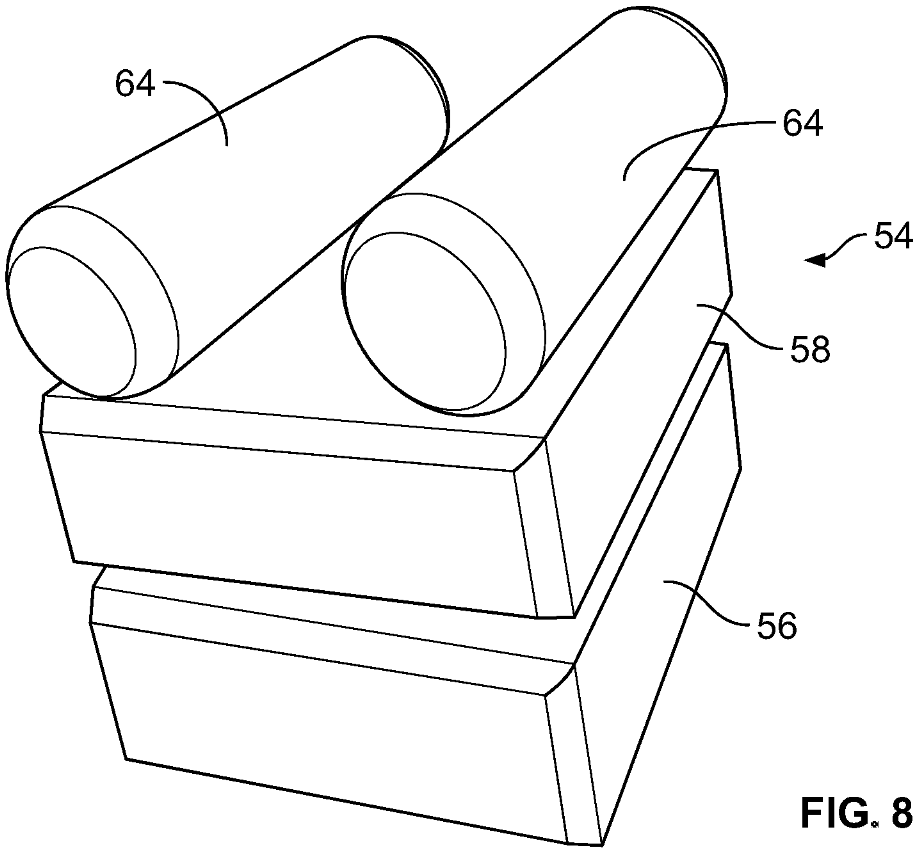
FIG. 8 is an example of a foam insert for use in the leg immobilizer shown in FIG. 1.
Figure 9:
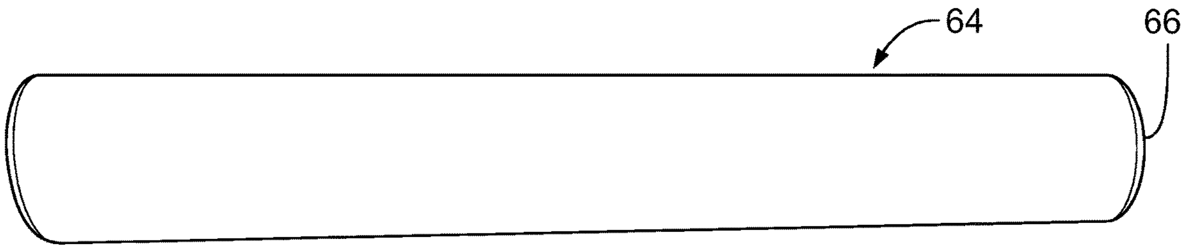
FIG. 9 is an example of a compressible foam tube for use in the leg immobilizer shown in FIG. 1.

In a second example, the foam insert 54 may be formed utilizing a lower foam portion 56 having a bottom foam surface 60 and an upper foam surface 62 (see FIG. 7). The lower foam portion 56 may still be comprised of semi-rigid foam. In this example the foam insert 54 further includes a plurality of compressible foam tubes 64 positioned on the upper foam surface 62 of the lower foam portion 56. When inserted into the removable cover 52 (not shown) the plurality of compressible foam tubes 64 form the leg engagement channel 36. In still another example shown in FIG. 8, the foam insert 54 can be comprised of a lower form portion 56, an upper foam portion 58 and a plurality of compressible foam tubes 64 positioned on the upper foam portion 58. In this example, the lower foam portion 56 is a semi-rigid foam and the upper foam portion 58 is compressible foam. In this version both the compressible foam tubes 64 as well as the upper foam portion 58 provide a comforting and pleasant surface for the patient's leg 12. An additional image of one of the plurality of compressible foam tubes 64 is shown in FIG. 9. In this example, the compressible foam tubes 64 can include a compressible foam tube cover 66 to further protect the compressible foam tubes 64 from exposure to fluids. In addition, the use of compressible foam tubes 64 allows for a quick replacement of tubes with different dimensions to quickly adjust the channel width 50 of the leg engagement channel 36.

Figure 10:
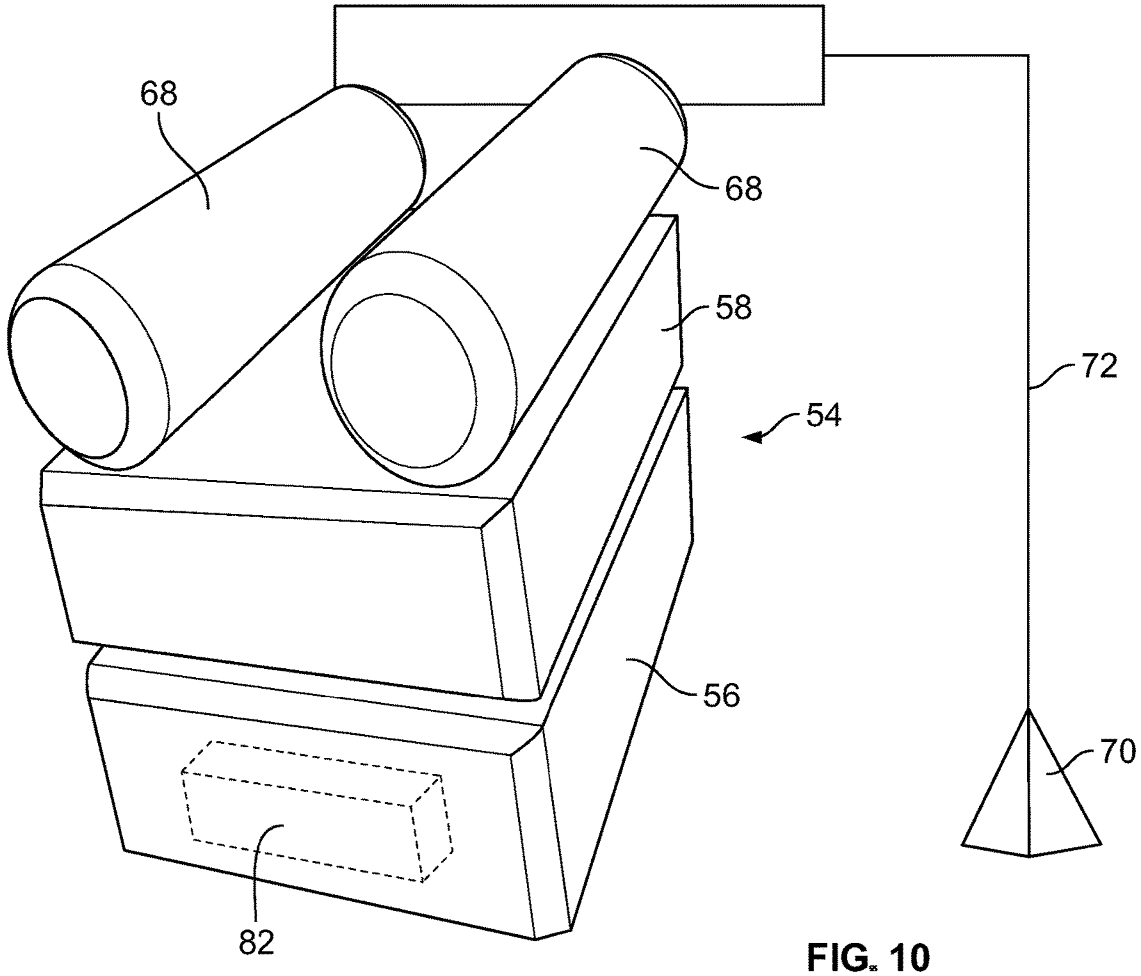
FIG. 10 is an example of a foam insert for use in the leg immobilizer shown in FIG. 1.

In an example shown in FIG. 10, the compressible foam tubes 64 may be replaced by a plurality of inflatable tubes 68. The plurality of inflatable tubes 68 may be in communication with an inflating element 70 via a tubular conduit 72. The inflating element 70 may be as simple as a ball pump or may as advanced as a pressure sensitive inflation pump that ceases operation once an optimal comfort pressure has been achieved. In this example, the plurality of inflatable tubes 68 may be inflated to reduce with channel width 50 of the leg engagement channel 36 until lateral movement of the leg 12 is prevented while still maintaining patient 14 comfort. This adjustable inflation level provides a way to balance immobilization as well as comfort.

Figure 11:
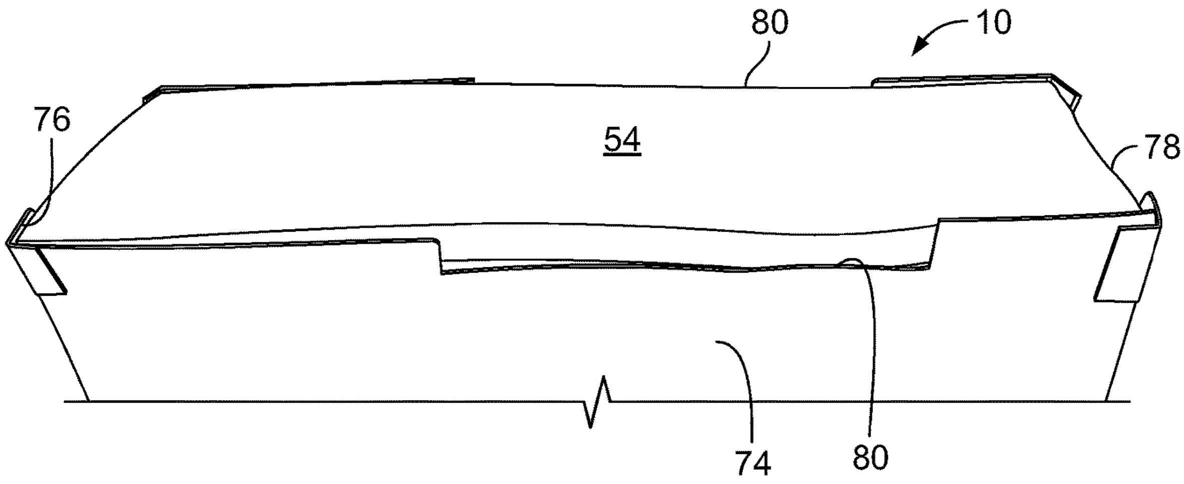
FIG. 11 shows a partial construction of the leg immobilizer shown in FIG. 1.

In any of the preceding examples, the leg immobilizer 10 may include a rigid frame 74 housing the foam insert 54 (FIG. 11). The use of a rigid or semi rigid frame 74 allows for easy installation of multi-piece foam inserts 54 as described above into the removable cover 52. In addition, it can also provide additional resistance to the foam insert 54 resulting in a stronger resistance to lateral movement of the patent 12. The rigid frame 74 includes a thigh entry cutout 76 and an ankle exit cutout 78 in opposing ends to allow the leg 12 to be positioned within the leg engagement channel 36 without impediment. In addition, the rigid frame 74 may include a plurality of knee region cutouts 80 to further increase the depth of medical imaging below the patient's knee portion 20. Additionally, in any of the aforementioned examples, a weight element 82 may be positioned in the lower foam portion 56 (see FIG. 10). This can assist in frictional retention of the leg immobilizer 10 on any surface on which it is utilized. Further the leg immobilizer 10 may include a vertical retention member 84 that is utilized to prevent vertical movement of the leg 12 of the patient 14 when positioned within the leg engagement channel 36. Although a variety of vertical retention members 84 are contemplated, in one example the vertical retention member 84 comprises a vertical retention strap.

Figure 12:
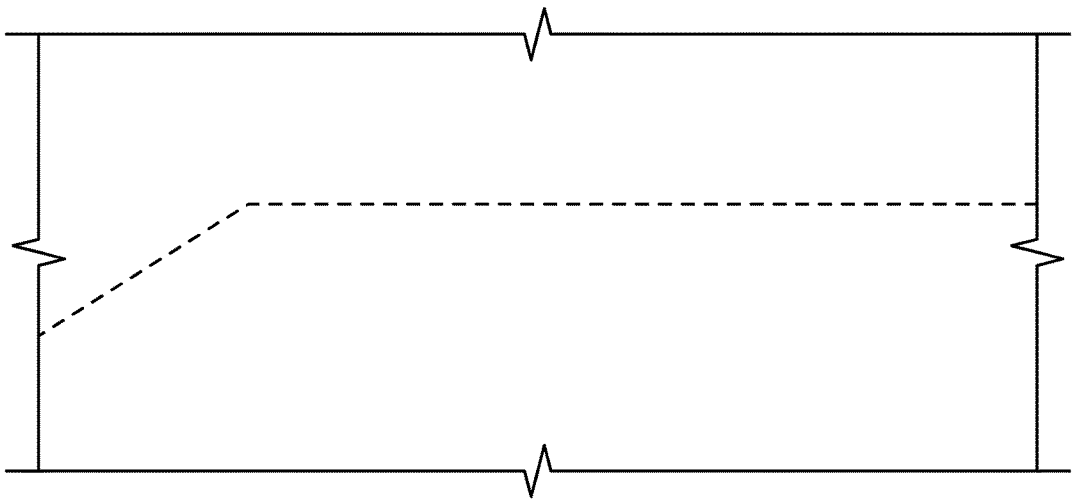
FIG. 12 is a side view of an example of a foam insert for use in the leg immobilizer shown in FIG. 1.

In FIG. 12, a side view of one example of the foam insert 54 is shown. In the previous illustrations the channel depth 48 has been illustrated as relatively constant prior to the insertion of the patient's leg 12. This is because the foam insert 54 will generally conform to the weight if the patient's leg 12. However, in the present example shown the thigh engagement portion 38 is angled away from the bottom surface 28 of the padded bolster 26 while the popliteal fossa engagement portion 40 and the calf engagement portion 42 are generally parallel to the bottom surface 28. In this example the pressure on the patient's thigh portion 16 is reduced to further aid in comfort.

Figure 13:
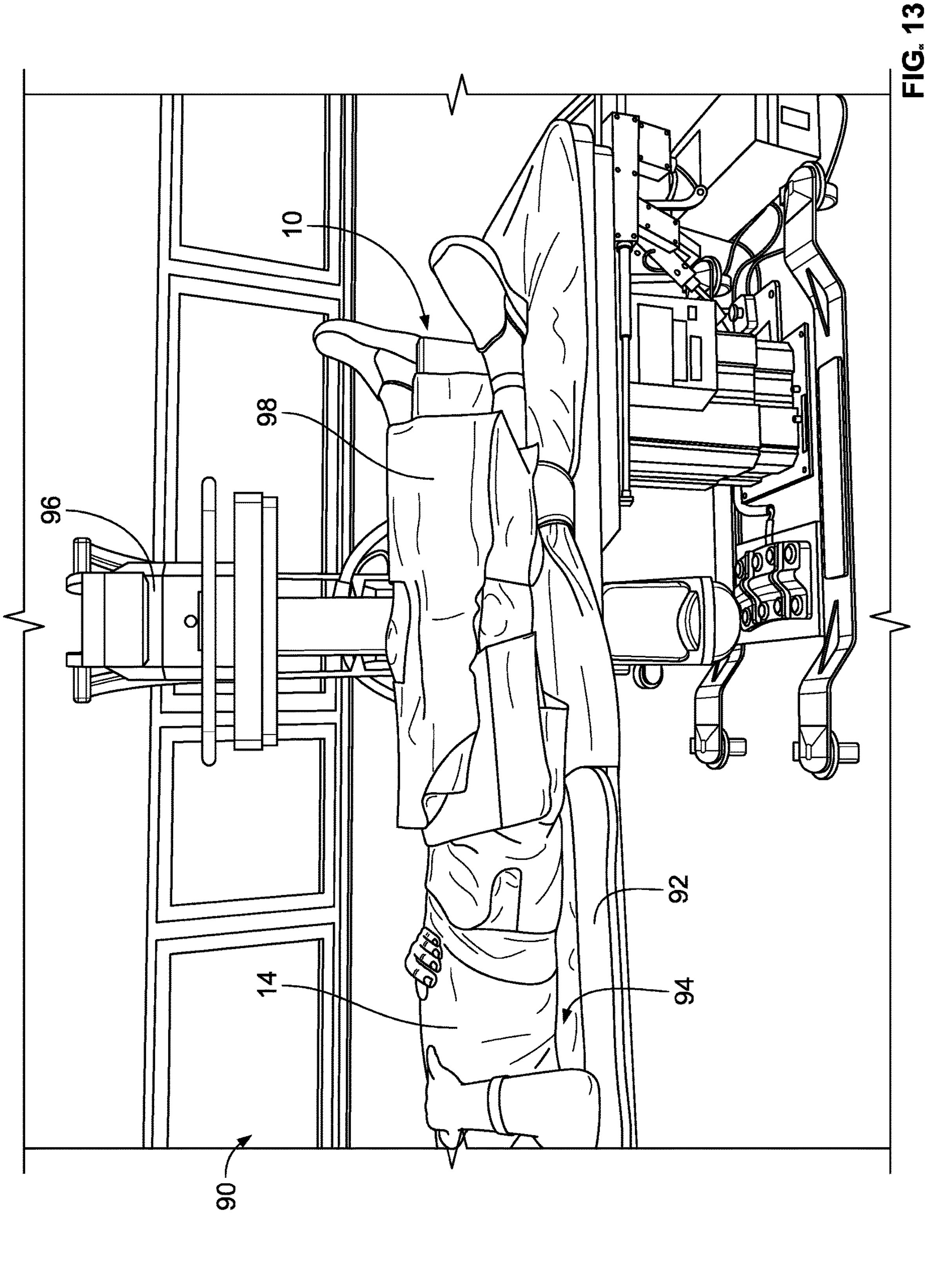
FIGS. 13 and 14 show a medical arrangement utilizing the leg immobilizer shown in FIG. 1.
Figure 14:
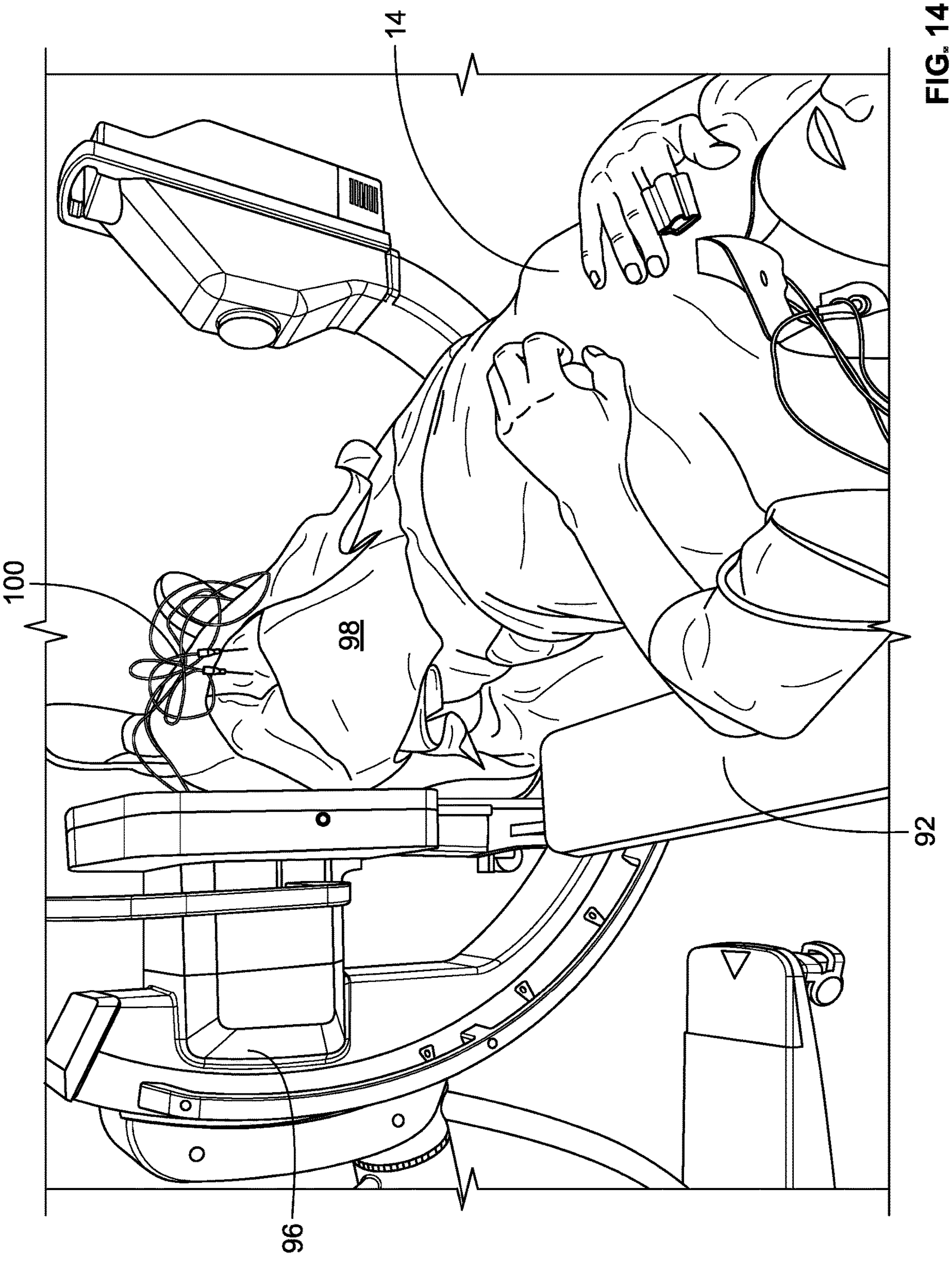
Figure 15:
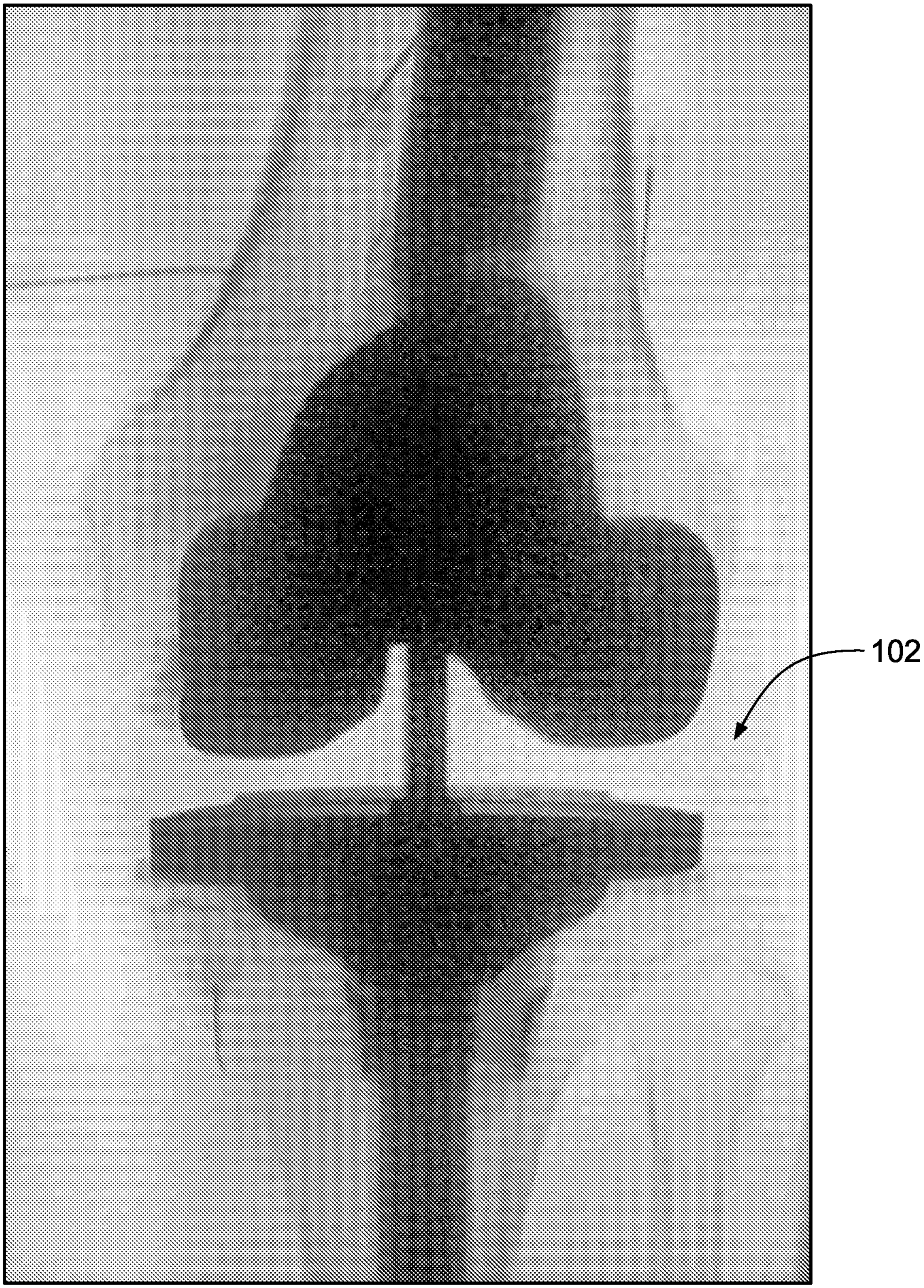
FIG. 15 shows a medical imaging result utilizing the medical arrangement shown in FIG. 13.

FIGS. 13 and 14 illustrate a medical arrangement 90 for use with the leg immobilizer 10 as described above in the various examples. The medical arrangement 90 includes a procedure table 92 for supporting the patient 14 in a supine position 94. The medical arrangement 90 further includes at least one medical imaging device 96 positioned in close relation with the procedural table 92. The leg immobilizer 10 is positioned on the procedure 92 and the patient's leg 12 is positioned within the leg engagement channel 36. A vertical retention strap 84 is utilized to strap the patient's leg 12 to the leg engagement channel 36 and the procedure table 92. As can be seen, the use of the described leg immobilizer 10 as described above leaves the knee portion 20 of the patient 14 elevated and clear of any obstructions for side imaging using the medical imaging device 96. A medically protective drape 98 (or series thereof) may be placed over the sections of the patient's leg 12 not intended for imaging. A doctor or practitioner (not shown) may insert medical needles 100 into the patient's knee 12 while monitoring their placement using real time medical imaging displays 102 (see FIG. 15). This allows precise placement. The use of the described leg immobilizer 10 allows a reliable restraint against unwanted patient repositioning during the procedure.

Although the leg immobilizer 10 has been described with regard to its uses and benefits to patient 14 positioning during medical procedures, it is also contemplated that in its basic form may be beneficial to patient's 14 at home recovery as well. Many post procedure guidelines as well as many conditions require leg elevation to extended periods at home or overnight while sleeping. This can be difficult for users to maintain using conventional pillows or other supports. Movement during sleep quite easily shifts such make shift elevating structure. The present leg immobilizer 10, with or without the vertical retention strap 84, could be utilized as a simple leg elevation device while resisting the users uncontrolled repositioning even during sleep.

What is claimed is:

1. A leg immobilizer for securing a leg of a patient during a procedure in an elevated position, the leg including a thigh portion, a popliteal fossa portion and knee portion, a calf portion and an ankle portion, the leg immobilizer comprising:

a padded bolster having a bottom surface, a front surface, a rear surface, and a top surface; and a leg engagement channel formed in said top surface, said leg engagement channel including a thigh engagement portion, a popliteal fossa engagement portion, a calf engagement portion, an ankle engagement portion, and two continuous leg side engagement surfaces extending from said thigh engagement portion to said ankle engagement portion;

wherein said two continuous leg side engagement surfaces prevent lateral movement of the leg of the patient when positioned within the leg engagement channel, wherein said thigh engagement portion is angled away from said bottom surface, and wherein said popliteal fossa engagement portion and said calf engagement portion are parallel to said bottom surface.

2. The leg immobilizer according to claim 1, wherein said popliteal fossa engagement portion has a channel depth such that the knee portion of the leg of the patient extends above said top surface when the leg of the patient is positioned within the leg engagement channel.

3. The leg immobilizer according to claim 1, wherein said padded bolster comprises a removable cover and a foam insert positioned within said removable cover.

4. The leg immobilizer according to claim 3, wherein said foam insert comprises a lower foam portion comprising rigid foam and an upper foam portion comprising compressible foam.

5. The leg immobilizer according to claim 4, further comprising a weight element positioned in said lower foam portion.

6. The leg immobilizer according to claim 3, wherein said foam insert comprises:

a lower foam portion comprising rigid foam, said lower foam portion having a bottom foam surface and an upper foam surface; and a plurality of compressible foam tubes positioned on said upper foam surface to form said leg engagement channel.

7. The leg immobilizer according to claim 3, wherein said foam insert comprises:

a lower foam portion comprising rigid foam, said lower foam portion having a bottom foam surface and an upper foam surface; and a plurality of inflatable tubes positioned on said upper foam surface to form said leg engagement channel, said plurality of inflatable tubes having an adjustable inflation level to control a channel width of said leg engagement channel.

8. The leg immobilizer according to claim 3, further comprising a rigid frame housing said foam insert.

9. The leg immobilizer according to claim 8, wherein said rigid frame housing comprises a thigh entry cutout and an ankle exit cutout.

10. The leg immobilizer according to claim 1, further comprising a vertical retention member, said vertical retention member preventing vertical movement of the leg of the patient when positioned within the leg engagement channel.

11. The leg immobilizer according to claim 10, wherein said vertical retention member comprises a vertical retention strap.

12. A medical arrangement for securing a leg of a patient during treatment, the leg including a thigh portion, a popliteal fossa and knee portion, a calf portion and an ankle portion, the medical arrangement comprising:

a procedure table for supporting the patient in a supine position;

at least one medical imaging device;

a leg immobilizer comprising:

a padded bolster having a bottom surface, a front surface, a rear surface, and a top surface, said padded bolster comprising a removable cover and a foam insert positioned within said removable cover;

a leg engagement channel formed in said top surface, said leg engagement channel including a thigh engagement portion, a popliteal fossa engagement portion, a calf engagement portion, an ankle engagement portion, and two continuous leg side engagement surfaces extending from said thigh engagement portion to said ankle engagement portion;

a vertical retention member preventing vertical movement of the leg of the patient when positioned within the leg engagement channel;

wherein said two continuous leg side engagement surfaces prevent lateral movement of the leg of the patient when positioned within the leg engagement channel, and wherein said thigh engagement portion is angled away from said bottom surface, and wherein said popliteal fossa engagement portion and said calf engagement portion are parallel to said bottom surface.

13. The medical arrangement according to claim 12, wherein said popliteal fossa engagement portion has a channel depth such that the knee portion of the leg of the patient extends above said top surface when the leg of the patient is positioned within the leg engagement channel.

14. The medical arrangement according to claim 12, where said foam insert comprises a lower foam portion comprising semi rigid foam, an upper foam portion comprising compressible foam, and a weight element positioned in said lower foam portion.

15. The medical arrangement according to claim 14, further comprising:

a plurality of compressible foam tubes positioned on said upper foam portion, said plurality of foam tubes and said upper foam portion forming said leg engagement channel.

16. The medical arrangement according to claim 12, wherein said foam insert comprises:

a lower foam portion comprising rigid foam, said lower foam portion having a bottom foam surface and an upper foam surface; and a plurality of inflatable tubes positioned on said upper foam surface to form said leg engagement channel, said plurality of inflatable tubes having an adjustable inflation level to control a channel width of said leg engagement channel.

17. The medical arrangement according to claim 12, wherein said removable cover comprises a polyurethane material.

18. The medical arrangement according to claim 12, further comprising a rigid frame housing said foam insert.

19. The medical arrangement according to claim 18, wherein said rigid frame comprises a thigh entry cutout, an ankle cutout and a plurality of side knee cutouts.

* * * * *